United States Patent
Aguilar Mendez et al.

(10) Patent No.: US 10,788,156 B2
(45) Date of Patent: Sep. 29, 2020

(54) PROTECTOR FOR THREADED END OF A TUBULAR COMPONENT WITH FLEXIBLE SEAL

(71) Applicant: VALLOUREC OIL AND GAS FRANCE, Aulnoye-Aymeries (FR)

(72) Inventors: Jose Antonio Aguilar Mendez, Veracruz (MX); Julie Felix, Nantes (FR); Daniel Viel, Oyonnax (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 74 days.

(21) Appl. No.: 15/537,727

(22) PCT Filed: Dec. 18, 2015

(86) PCT No.: PCT/FR2015/053634
§ 371 (c)(1),
(2) Date: Jun. 19, 2017

(87) PCT Pub. No.: WO2016/102848
PCT Pub. Date: Jun. 30, 2016

(65) Prior Publication Data
US 2018/0274711 A1    Sep. 27, 2018

(30) Foreign Application Priority Data

Dec. 23, 2014 (FR) .................................... 14 63274
Jan. 6, 2015 (FR) .................................... 15 50053

(51) Int. Cl.
*F16L 57/00* (2006.01)
*E21B 17/00* (2006.01)
(Continued)

(52) U.S. Cl.
CPC .......... *F16L 57/005* (2013.01); *E21B 17/006* (2013.01); *F16L 55/115* (2013.01); *F16L 55/1108* (2013.01); *F16L 55/1152* (2013.01)

(58) Field of Classification Search
CPC .... F16L 57/005; F16L 55/1108; F16L 55/115; F16L 55/1152
(Continued)

(56) References Cited

U.S. PATENT DOCUMENTS 3,485,271 A     12/1969  Halsey
3,818,946 A  *  6/1974   Bonnes ................. B65D 59/00
                                                       138/96 R
(Continued)

FOREIGN PATENT DOCUMENTS

FR    2 912 730 A1    8/2008
FR    2 998 639 A1    5/2014
WO    2014/053103 A1  4/2014

OTHER PUBLICATIONS

International Search Report dated Mar. 9, 2016 in PCT/FR2015/053634 filed Dec. 18, 2015.

*Primary Examiner* — James F Hook
(74) *Attorney, Agent, or Firm* — Oblon, McClelland, Maier & Neustadt, L.L.P.

(57) ABSTRACT

A temporary protector is for an extremity of a tubular joint component for drilling or operating hydrocarbon wells. The protector includes a sleeve to be attached to the component extremity and to protect a free end portion and a thread of the component extremity. The sleeve has a thread to engage with the thread of the component extremity and a peripheral sealing device assembled sealingly thereon such that it is liable to be brought into contact with a surface of the component located downstream of the thread of the component extremity, to provide a seal downstream of the thread. When the protector is being installed on the tubular
(Continued)

component, at the time that the thread of the sleeve engages with the thread of the component extremity, at least one portion of the sealing is located axially downstream of the thread of the component extremity.

12 Claims, 3 Drawing Sheets

(51) Int. Cl.
  *F16L 55/115* (2006.01)
  *F16L 55/11* (2006.01)
(58) Field of Classification Search
  USPC .............................................. 138/96 R, 96 T
  See application file for complete search history.

(56) References Cited

U.S. PATENT DOCUMENTS

| | | | |
|---|---|---|---|
| 4,020,873 A * | 5/1977 | Palarino | B65D 59/00 138/96 T |
| 4,185,665 A * | 1/1980 | Flimon | F16L 57/005 138/89 |
| 4,210,179 A * | 7/1980 | Galer | B65D 59/06 138/96 T |
| 4,337,799 A * | 7/1982 | Hoover | F16L 57/005 138/89 |
| 4,429,719 A * | 2/1984 | Mosing | B65D 59/06 138/89 |
| 4,487,228 A | 12/1984 | Waldo et al. | |
| 4,549,337 A * | 10/1985 | Newell | B29C 70/78 138/96 T |
| 4,655,256 A * | 4/1987 | Lasota | B65D 59/02 138/96 T |
| 4,796,668 A * | 1/1989 | Depret | B65D 59/00 138/96 R |
| 5,255,942 A * | 10/1993 | Kenworthy | B29C 65/72 285/21.2 |
| 10,487,593 B2 * | 11/2019 | Aguilar Mendez | F16L 57/005 |
| 2005/0045240 A1 * | 3/2005 | Casteran | F16L 15/004 138/96 T |
| 2005/0166986 A1 | 8/2005 | Dell'erba et al. | |
| 2006/0042709 A1 * | 3/2006 | Takano | E21B 17/042 138/96 T |
| 2011/0148103 A1 | 6/2011 | Courtois et al. | |
| 2014/0352837 A1 | 12/2014 | Yamamoto et al. | |
| 2015/0308605 A1 | 10/2015 | Aguilar et al. | |
| 2017/0370160 A1 * | 12/2017 | Aguilar Mendez | B65D 59/06 |

* cited by examiner

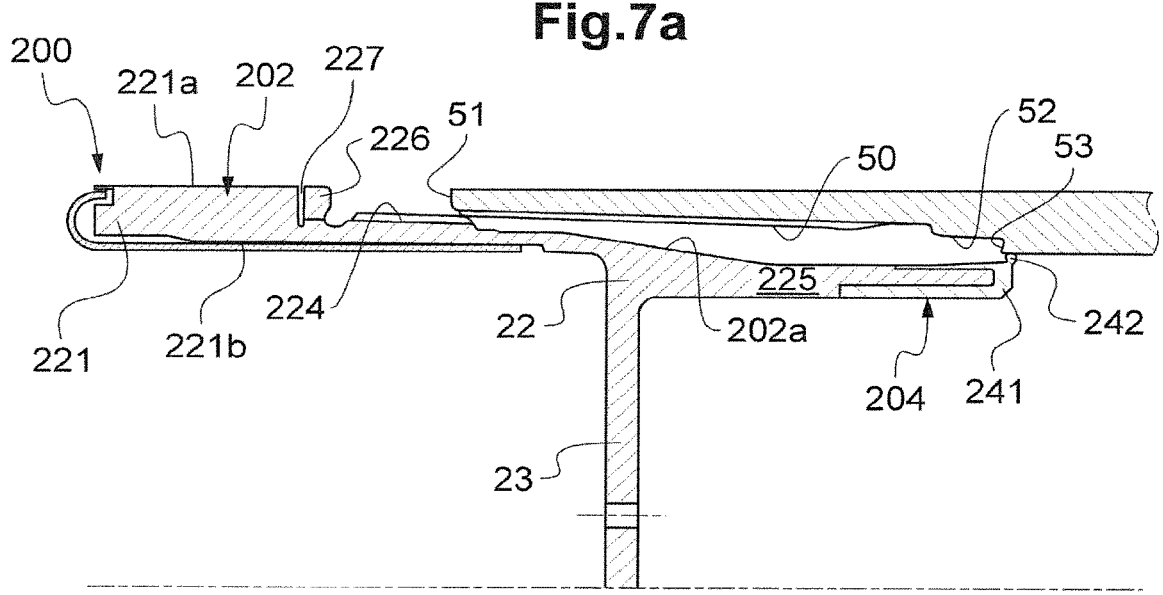
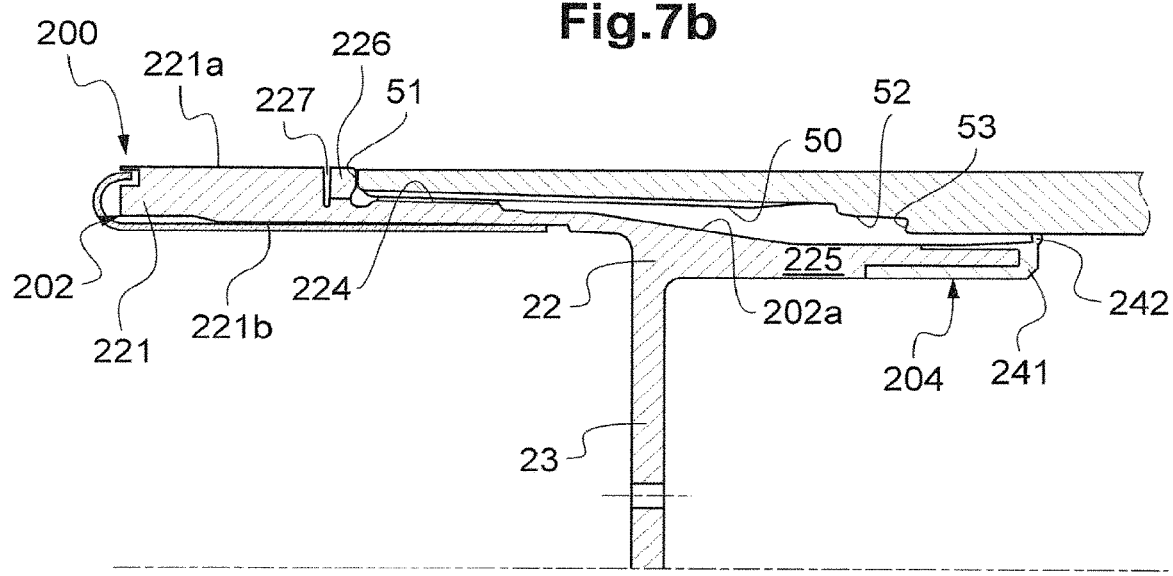

PROTECTOR FOR THREADED END OF A TUBULAR COMPONENT WITH FLEXIBLE SEAL

BACKGROUND

The invention relates to tubular threaded joint components used for example in oil production and more specifically to protect the extremities of some of said components.

In this document, "component" shall mean any element or accessory that is used to drill or operate a well and that is designed to be assembled by means of a thread to another component to form a tubular threaded joint with that other component. The component may for example be a relatively long pipe (in particular around ten meters long), a tubular sleeve several tens of centimetres long, an accessory for said pipes (suspension device or "hanger", section-change part or "cross-over", safety valve, connector for drilling rod or "tool joint", "sub" and similar).

The components are usually assembled together before being lowered into the hydrocarbon well or similar well to form a drill string, a column of casing pipes or liners, or even a column of production pipes ("tubing").

The specification API 5CT issued by the American Petroleum Institute (API), which is equivalent to ISO standard 11960:2004 issued by the International Standardization Organization (ISO) covers pipes used as casing or tubing, and specification API 5B defines the standard threads for such pipes.

API specification 7 gives details of threaded shouldered connectors for rotary drilling rods.

Manufacturers of tubular threaded joint components have also developed "premium" threaded joints that have specific thread geometries and specific means to enhance the operational performance of same, in particular in terms of mechanical strength and sealing.

The aforementioned components have at least one male or female threaded extremity designed to be screwed onto one corresponding female or male threaded extremity of another drilling or operating component. It is therefore essential that the male or female threaded extremity of same be as undamaged, uncontaminated and undeteriorated as possible from the time they come off the related manufacturing line to the time they are used, and also between two successive uses. Indeed, in addition to the threads, any seats or stops performing specific complementary functions also need to be protected against corrosion, dust and shocks (or impacts), in particular to guarantee sealing during use.

For protection purposes, the extremities of the aforementioned components are usually coated with an anti-seizing grease immediately before assembly.

It has been proposed in numerous documents to replace the grease with a fine layer of lubricant of predetermined thickness applied in factory.

Thus, for example, documents U.S. Pat. Nos. 6,933,264, 6,869,111 and WO 2003/102457 propose applying, in factory, a layer of "semi-dry" lubricant that is free of heavy metals. Documents U.S. Pat. No. 6,027,145, EP 1211451 and FR 2892174 propose applying a layer of dry lubricant based on particles of solid lubricant.

In such cases where a lubricant is applied in factory, it is also more specifically necessary to provide the best possible protection for the layer of lubricant coating the extremities of the components, both against mechanical removal and against contamination (sand, debris) that could reduce the effectiveness of the lubricant.

To obtain such protection, a protection device is usually placed on the male and female extremities of the tubular threaded joint components, as required in specification API 5CT (in paragraph 12.2).

In general, a protection device for a threaded extremity of a tubular threaded joint component for drilling or operating hydrocarbon wells includes a protective sleeve designed to cover the thread to be protected, combined with one or more sealing devices.

The standard specifies that the protector shall protect the extremities against any damage that could be caused under normal handling and transportation conditions of the component. The external protectors (for the male extremities) cover the entire thread of the tubular component and the internal protectors (for the female extremities) equivalently cover the entire internal thread.

In particular, the protectors should normally be designed to prevent the ingress of dust and water around the threads during transportation and storage. The normal storage time is around one year.

The shape of the threads of the protectors is such that the threads of the tubular component are preserved by the protector.

Several devices of this type have been proposed, notably in EP 0148807, US 2006/0042709, WO 2005/075877 and WO 2005/024282, the latter three documents more specifically concerning protectors for joints previously coated with lubricant in factory. It has been demonstrated that some of them pose a risk of damaging the protection device when being installed.

WO2012/028692 provides for an elastomer film between the protector and the component that is attached to the protector by gluing or by a retaining ring, the ring being welded to the protector. The film is provided with a slip agent between the film and the component. The film has an interference fit with the imperfect-thread zone of the component. The film is torn when the protector is removed, and can therefore only be used once. The seal is poor. The whole is difficult to assemble on the component. There is a high risk of damaging the film.

It has been observed that, when installing the protector, the sealing device may be damaged and even torn off by the thread of the tubular component. Indeed, the machined thread has particularly sharp edges that may cut said sealing device when the connector is being tightened. Furthermore, such cutting may result in the formation of shavings that are liable to become jammed in the thread and to contaminate same, which is not desirable.

BRIEF SUMMARY

The invention is intended to improve the situation, and to do so proposes a temporary protector for an extremity of a tubular joint component for drilling or operating hydrocarbon wells, said extremity having at least one thread and at least one free end portion, said component having a body downstream of the threaded extremity, said protector including:

a sleeve designed to be attached to the extremity of the component and designed to protect said free end portion and the thread of said extremity of the component, said sleeve having a thread that is designed to engage with the thread of the extremity of the component and that extends axially over a distance equal to or less than the axial distance of the thread of the extremity of the component, a peripheral sealing device assembled sealingly on the sleeve and such that it is liable to be brought into contact with a surface of said component located downstream of the thread of the extremity of the component, such as to provide a seal downstream of said thread, The protector is characterized in that the sealing device and the sleeve are arranged such that, when the protector is being installed on the tubular component, at the time that the thread of the sleeve engages with the thread of the extremity of the tubular joint component, at least one portion of the sealing device designed to come into contact with the surface of said component is located axially downstream of the thread of the extremity of said component.

The term "downstream" is in this case considered in relation to the free end portion of the extremity considered to be upstream. Thus, the downstream portion of the thread is a main portion or body of the component.

Thus, by offsetting the portion of the sealing device, or gasket, designed to be in sealing contact with the tubular component downstream of the thread, i.e. to the generally smooth body of the component, when the thread of the sleeve begins to engage with the thread of the extremity of said tubular component, said portion of the sealing device is safeguarded from being cut by the thread of said threaded component during tightening. The sleeve is subjected to a translational movement combined with a rotational movement during tightening.

More specifically, during a first installation phase of the protector, said protector is moved in translation substantially in a longitudinal direction of the tubular component until the thread of the sleeve comes into contact with the thread of the tubular component.

During this first phase, the portion of the sealing device designed to come into sealing contact with the tubular component then also moves in translation in the same longitudinal direction until it is downstream of the thread of the tubular component and level with the smooth body of the component. In this case, the notion of "smooth" means an absence of deliberate roughness and sharp edges. The notion of "smooth" shall be understood to mean a surface of known roughness that is able to form a seal with an elastic lip. The roughness may be formed by rolling. The roughness may correspond to the roughness of a coating of the core of the component.

The protector is then screwed onto the threaded extremity of the component to be protected in a second phase.

During this subsequent tightening, the rotation of the portion of the sealing device intended to come into sealing contact with the tubular component is therefore carried out in full in contact with a zone of the body of the tubular component, which is downstream of the thread and generally smooth. Cutting by said thread is thus prevented.

According to a preferred embodiment, the length of the sleeve downstream of the thread of same is greater than the length of the thread of the tubular component to be protected. The portion of the sealing device designed to come into contact with the surface of the component is located substantially at a downstream extremity of said sleeve. Thus, by lengthening the sleeve, the general composition of the protector remains relatively simple, and it remains easy to manufacture.

For a female extremity, the length of the thread of the sleeve and of the portion downstream of the thread may be greater than the sum of the length (projected onto the axis) of the thread of the extremity to be protected and the axial distance between said thread and a stop surface joined to the bore of the body of the component.

Preferably, the ratio of the axial distance of the thread of the tubular component to the axial distance of the thread of the sleeve of the protector is equal to or greater than 2, and preferably equal to or greater than 3.

Advantageously, the sealing device is rigidly connected to the sleeve. Rigidly connecting the sealing device to the sleeve, i.e. making it non-detachable, obviates the risk of the device being lost.

According to one embodiment, the sealing device is secured to the sleeve by overmoulding. Overmoulding notably enables a good join between the material of the sealing device and the material of the sleeve.

Preferably, the sealing device is secured to the sleeve by overmoulding performed by two-component injection.

Advantageously and complementarily, the protector includes a secondary sealing device that can be brought into contact firstly with a surface of said component, at least at the free end portion of the extremity of the component, and secondly with said sleeve such as to provide a seal upstream of said thread.

The advantageous and complementary features related to the first sealing device can also be applied to the secondary sealing device. Thus, the secondary sealing device can notably be rigidly connected to the sleeve and/or overmoulded onto the sleeve.

Advantageously and complementarily, the contact surface between the sealing device and the sleeve is greater than 10% of the total length of the sleeve, and preferably greater than 20%. A significant overlap between the sealing device and the sleeve makes it possible to further enhanced the hold of the sealing device on the sleeve and to provide additional protection, since the sealing device is able to absorb at least a portion of any external shocks. Said contact surface reduces the risk of the sealing device being accidentally ripped off when the sealing device is made by overmoulding onto the sleeve.

Advantageously and complementarily, the sealing device has at least one flap extending at least above the portion of the sealing device designed to come into contact with the surface of the component in order to at least partially protect same from the light. Such a flap forms a screen that can provide some protection to the portion of the sealing device forming a gasket from sunlight and in particular from ultraviolet rays liable to accelerate the ageing of same and to affect the elastic joining properties of same. The service life of the sealing device can be prolonged beyond the service life of the material exposed to UV.

Advantageously, the portion of the sealing device designed to come into contact with the surface of the tubular component is elastically flexible in at least one longitudinal axial direction of the protector. Said portion may be radially elastic.

The use of such a flexible portion enables the gasket to be easily adapted to slight surface irregularities in the tubular component. When installing the protector, the flexible portion is thus folded about itself and adapted to the diameter of the component. The protector remains easy to install.

Alternatively, the portion of the sealing device designed to come into contact with the surface of the tubular component has a bevelled contact surface and a longitudinal section that increases in the downstream-to-upstream direction. The presence of a bevelled portion also enables adaptation to variations in the diameter of the tubular component.

According to a first preferred embodiment, the protector is designed for a male extremity with an external thread.

According to a second preferred embodiment, the protector is designed for a female extremity with an internal thread.

The present invention also relates to a kit including the protector described above, at least one sleeve and at least one related sealing device.

The present invention also relates to a tubular threaded joint component for drilling or operating hydrocarbon wells including an extremity fitted with at least one thread and a free end portion, said component being fitted with the protector described above screwed onto said thread of said tubular component.

BRIEF DESCRIPTION OF THE DRAWINGS

Other features and advantages of the invention are set out in the detailed description below and the attached drawings, in which:

FIGS. 7a and 7b are longitudinal half cross-sectional views of a protector according to a fourth embodiment.

DETAILED DESCRIPTION

Figure 1:
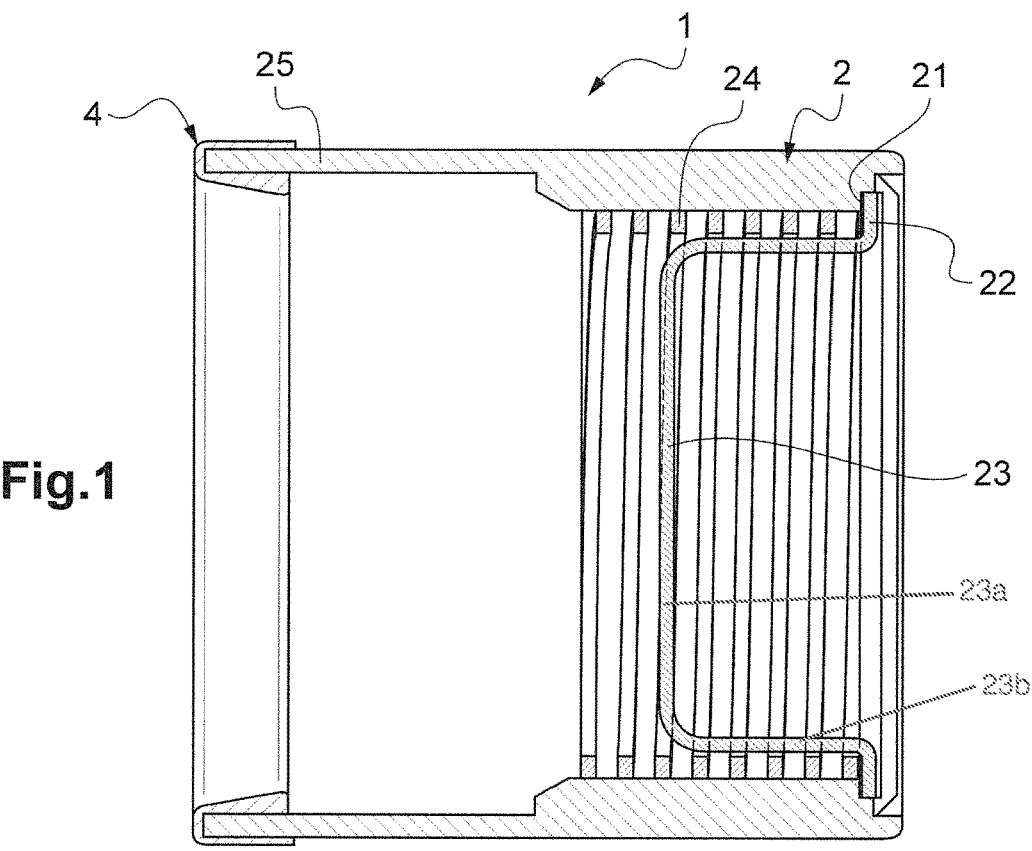
FIG. 1 is a schematic longitudinal cross-sectional view of a protector according to a first embodiment.

The attached drawings may both complement the invention and contribute to the definition of same, as appropriate.

A protector is intended to protect the threaded extremity of a tubular component of a tubular threaded joint (used for drilling or operating hydrocarbon wells or similar) against mechanical damage, contamination (chemical and material) and deterioration (corrosion) from the time same leaves the factory until it is used (the protection device potentially being assembled and disassembled several times), but also between two successive uses, by limiting (or even preventing) the storage lubricant (anticorrosion) and/or screwing lubricant from being scraped off and/or removed, specifically if the lubricant is applied permanently (semi-dry or dry lubricant, as detailed above), regardless of the dimensional variations of the tubular component (in particular the external diameter of same).

There are protectors for male threaded extremities (external thread) and protectors for female threaded extremities (internal thread).

In order to facilitate the assembly of the protector and in particular the installation of the sleeve on the threaded extremity, known sealing devices were usually removable, and the sealing device and the sleeve were assembled after placement of same on the components to be protected. The removable nature of the sealing device entails a risk of loss, in particular during handling of the component.

Furthermore, the removable nature of the sealing device also makes it difficult to achieve an optimum seal between the sleeve and the metal surface of the component, notably on account of manufacturing imperfections on the surface of the component. It may then be necessary to deform the protector to guarantee the seal.

WO2008/087302 proposes protection using half-shells and clamping. A high-quality seal is achieved, but a high number of parts are used.

Application FR 2 998 639 proposes a protection device offering enhanced adaptability of the seal to the dimensional variations in the components, while remaining relatively easy to assemble. To do so, a sealing device is rolled onto the sleeve before being unrolled onto the tubular component once the sleeve has been installed. This makes installation of the protector relatively more complex and slower. Furthermore, a larger quantity of elastomer is required to make a sealing device that can be rolled up.

In the remainder of the document, it is assumed that the component is intended for drilling or operating hydrocarbon wells and that it is fitted at one extremity with a sleeved tubular threaded joint from the VAM® family or equivalent. However, the protector according to the present application is not limited to this type of component or to the aforementioned type of extremity. Indeed, the invention relates to all types of tubular threaded joint components for drilling or operating and all types of threaded extremities of components, in particular API and premium components, such as VAM tubular threaded joints.

A tubular component has a body or main portion and two extremities: two male extremities, one-male extremity and one female extremity, or two female extremities. The component is usually made of steel or stainless steel.

The body includes a bore formed by rolling. The bore of the body may have a coated inner surface, for example with an anti-corrosion coating.

The roughness and diametrical tolerance of surfaces formed by rolling is much higher than the roughness and diametrical tolerance of machined surfaces. The bore of the body may extend to an axial position that is different to the axial position to which the outer surface of the body extends.

A male extremity has at least one external thread and at least one free end portion, the body of the tubular component extending downstream from the male extremity.

More specifically, "male extremity" shall be understood to mean the portion of a component that has surfaces that have been machined and/or ground to form a joint with a corresponding female portion.

A female extremity has at least one internal thread and at least one free end portion, the body of the tubular component extending downstream from said female extremity.

The internal and external end threads may be on one or more different threaded portions arranged on cylindrical or conical surfaces.

If the or a threaded portion is conical, it may be subdivided into a "perfect thread" sub-portion, in which the profile is constant and free of irregularities and imperfections (such as burrs) and an "imperfect or vanishing thread" sub-portion, the height of which decreases progressively and the profile of which may have irregularities or imperfections.

The end threads may include at least two distinct threaded portions that are axially and/or radially distant from one another, each of these portions potentially having perfect threads and vanishing threads.

The free end portion of the extremity of the component usually ends with an annular surface oriented substantially transversely.

The male or female extremity may also have one or more axial stop surfaces for a respectively female or male extremity of another component designed to be assembled with the component in question (to the free extremity, downstream of the thread or between two threaded portions) and one or more metal/metal sealing surfaces (to the free extremity, downstream of the thread or between two threaded portions) with the extremity in question. The protector is preferably designed to also protect these stop surfaces and/or these sealing surfaces from damage and corrosion.

The embodiments disclosed below, by way of nonlimiting example, relate to a male extremity of a tubular threaded joint.

A protector 1, as shown in FIG. 1, includes in general a sleeve 2 and a sealing device 4 that cooperate with one another and are designed to be placed on the (threaded) male extremity of a component.

The sleeve 2 is designed to protect at least a portion of the external thread of the male extremity and the free end portion, which is also part of the male extremity. To do so, the sleeve 2 is designed to be attached to the extremity of the component and is shaped accordingly. In particular, the sleeve has a substantially tube-shaped portion.

The sleeve 2 is preferably a one-piece sleeve. The sleeve may for example be made using a material injection method.

Since the protection is notably mechanical, the sleeve 2 provides a certain degree of rigidity, while being able to at least partially absorb shocks. To do so, the sleeve 2 may for example be made by injecting a thermoplastic material into a suitable mould. The different families of thermoplastic materials that can advantageously be used include notably polycarbonate mixtures such as polycarbonate-polyester (PC/PBT or PC/PET) and high-density and ultra-high-density polyethylenes (PE) (PE-HD, PE-UHD).

Annex I of the 2005 edition of the specification API 5CT sets out the requirements for thread protection devices, in particular the minimum resistance values against axial and angular (45°) impacts for three temperatures (−46, +21 and +66° C.).

More specifically, for example, the product selected may be the PE-HD produced by the company DOW and sold under the name DMBA-8904-NT7, or the PE-HD produced by the company BASELL and sold under the name LUPOLEN 4261 AG UV 6005, or the PE-UHD produced by the company TICONA and sold under the name GUR 5113, or the PC-PBT produced by the company BAYER and sold under the name MAKROBLEND 57916.

The sleeve 2 includes an upstream end portion 21 that is designed to be positioned at the free end portion of the tubular component and that preferably includes an inward-oriented radial projection in the form of a thick flange 22 that is designed to absorb shocks and impacts and to cover the transverse annular surface at the extremity of the free end portion of the male extremity (stop surface) in order to provide a (second) continuous local seal about the entire circumference of same at this point.

In one embodiment, a partition 23 closing the sleeve on the side opposite the sealing device 4 extends from the flange 22. The partition 23 forms a stopper and is designed to penetrate the bore of the tubular component. More specifically, the partition 23 has a substantially U-shaped section with a radial portion 23a and a circular portion 23b linking the radial portion 23a to the flange 22.

Alternatively, as shown in the following embodiments, the partition 23 may be substantially rectilinear and flat, i.e. radial.

The flange 22 and the partition 23 form a secondary seal.

In one embodiment, said protector 1 includes an annular peripheral lip. The annular peripheral lip may be formed from the sleeve or be attached thereto, notably by overmoulding of an elastic material.

This secondary sealing device is in particular brought into contact with a surface of said component, at least at the free end portion of the extremity of the component. This prevents the ingress of foreign bodies such as sand, salt and water via the end portion of the extremity of the component.

In the case of a protector for a male extremity, the surface of said component is in particular an inner surface. In the case of a protector for a female extremity, the surface of said component is in particular an outer surface.

Downstream of the end portion 21, an inner surface of the sleeve has a thread 24 able to cooperate by complementarity of form with the thread of the extremity of the tubular component to be protected. More simply, the thread 24 is adapted to fit the thread of the extremity of the component to be protected.

The thread 24 extends axially over a distance equal to or less than the axial distance of the thread of the extremity of the component. Indeed, it is desirable to be able to position and tighten the sleeve quickly. The number of turns of the thread 24 of the sleeve 2 is therefore generally low, so that it can be positioned in just a few screw turns, in particular 3 or 4.

The sleeve extends downstream of the thread 24 over a distance greater than the length, measured along a longitudinal direction of the tubular component, of the thread of said component, as far as a downstream end portion 25.

The downstream end portion 25 bears the sealing device 4. The sealing device 4 is designed to come into contact with an external surface of the body of the tubular component to be protected, at a portion located downstream of the thread of the extremity of said component.

The sealing device 4 is thus located at a distance from the thread 24 that is greater than the length of the thread of the extremity of the component to be protected.

Thus, when positioning the protector 1, when the thread 24 begins to engage with the thread of the extremity of the component, the sealing device 4 is located downstream beyond said thread of the extremity of the component.

The sealing device 4 is made of an elastomer able to form a gasket and to provide a seal with the tubular component.

More specifically, the sealing device 4 is made of a flexible (i.e. deformable) elastic material, i.e. one that can substantially return to its initial form. Said material may offer an elongation at break greater than 300%. To do so, it may for example be made by injection of a flexible material that is resistant to corrosion, chemical attacks, in particular industrial solvents and acids, and prolonged exposure to UV rays, without losing its mechanical properties. The different families of materials that may advantageously be used notably include neoprene elastomers such as Baypren 210 produced by LANXESS, EPDMs such as Nordel IP Hydrocarbon Rubber produced by DOW, nitriles, or any one of these materials placed in a polyolefin matrix. The sealing device 4 may be made of said material.

The sealing device 4 is rigidly connected to the sleeve 2.

More specifically, the sealing device 4 is made by moulding on the downstream end portion 25 of the sleeve 2 (overmoulding).

The overmoulding is done by injection. If the sleeve 2 is also formed by injection, it is advantageous to form the protector using a two-component injection method.

Complementarily, the sealing device 4 is formed such that it has a substantially trapezoid section with a bevelled inner surface, the thicker section being oriented towards the upstream portion of the protector.

The inclusion of a bevelled surface facilitates adaptation of the sealing device to the surface irregularities of the body of the tubular component.

More specifically, the bevelled surface forms an angle of 5-45° with a longitudinal axis of the protector.

Figure 2:
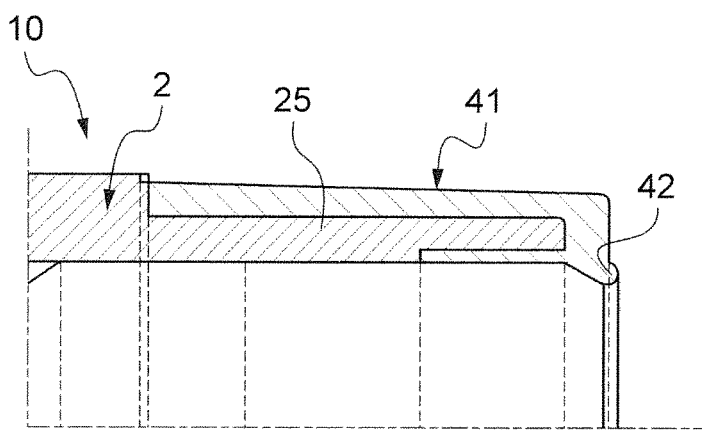
FIG. 2 is a partial schematic longitudinal cross-sectional view of a downstream extremity of a protector according to a second embodiment.

FIG. 2 is a partial schematic longitudinal cross-sectional view of a downstream extremity 25 of a protector 10 according to a second embodiment.

The protector 10 differs from the protector 1 essentially by the shape of the sealing device 41.

The sealing device 41 has a downstream portion 42 designed to come into contact with the surface of the component to be protected, having a rounded shape and substantially forming a peripheral bead.

Furthermore, complementarily, the sealing device 41 extends towards the upstream portion of the protector 10, along an outer surface of the sleeve 2 over a relatively large distance. The sealing device 41 thus forms an outer coating that provides additional protection against shocks.

Preferably, the contact surface between the sealing device and the sleeve is greater than 10% of the total length of the sleeve, and preferably greater than 20%.

Figure 3:
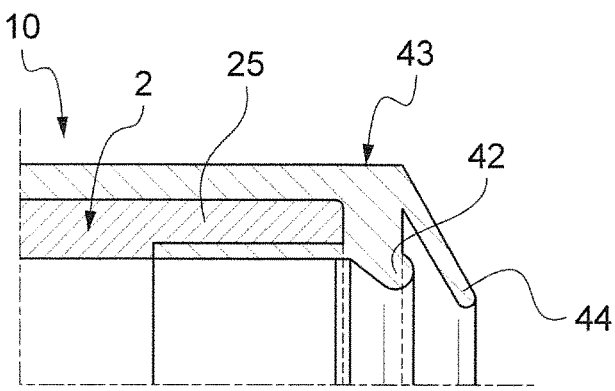
FIG. 3 shows a variant embodiment of the protector in FIG. 2 including a flap for protecting the sealing device.

FIG. 3 shows a variant embodiment of the protector 10 in FIG. 2 fitted with a sealing device 43. The sealing device 43 differs from the sealing device 41 in that it includes a flap 44 for protecting the downstream portion 42 intended to come into contact with the surface of the component to be protected.

The flap 44 makes it possible to limit the exposure of the downstream portion 42 to sunlight, and in particular to ultraviolet.

Figure 4:
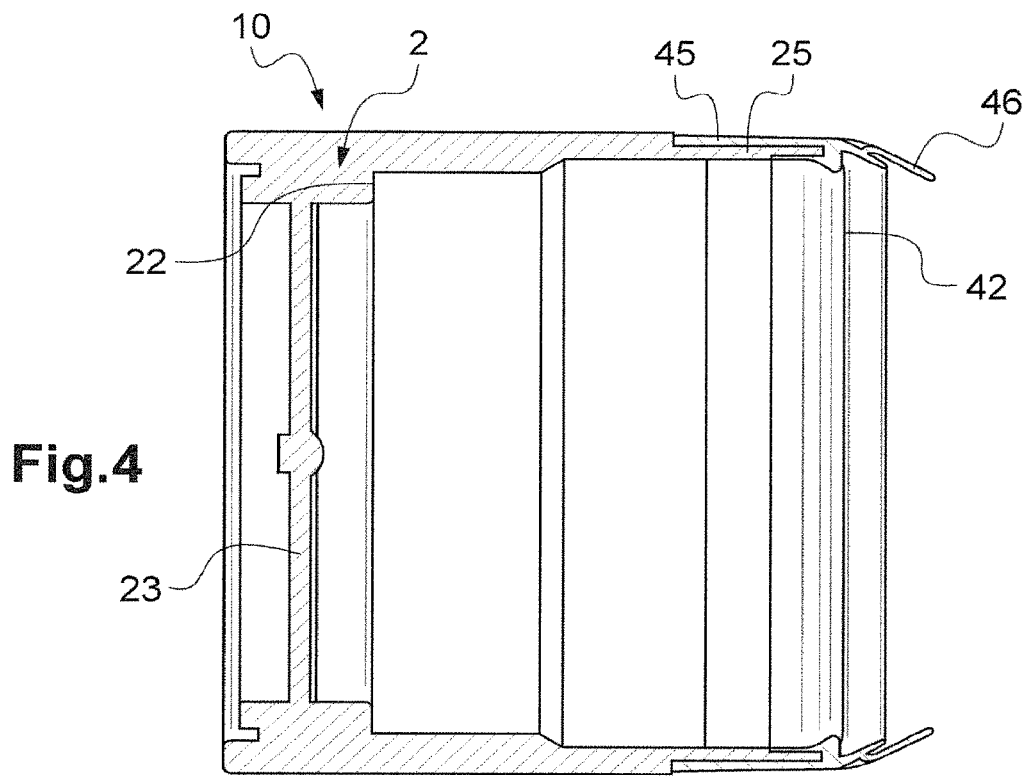
FIG. 4 shows a second variant embodiment of the embodiment in FIG. 2, FIGS. 5 and 6 are partial schematic longitudinal cross-sectional views of a downstream extremity of a protector according to a third embodiment.

FIG. 4 shows another variant embodiment of the protector 10 in FIG. 2 fitted with a sealing device 45. The sealing device 45 differs from the sealing devices 41 and 42 in that it includes a double flap 46 for protecting the downstream portion 42 intended to come into contact with the surface of the component to be protected.

Figure 5:
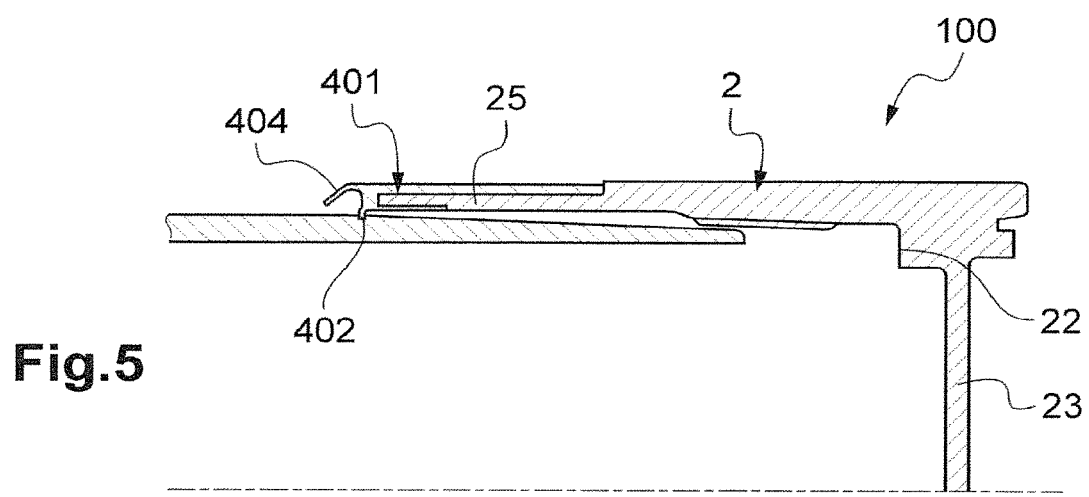
Figure 6:
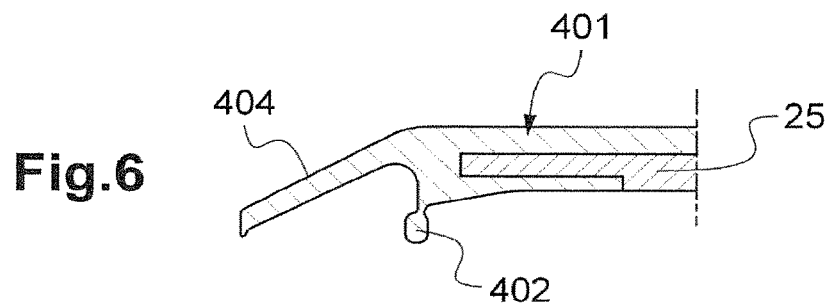

FIGS. 5 and 6 are partial schematic longitudinal cross-sectional views of a downstream extremity of a protector 100 according to a third embodiment.

The protector 100 differs from the protector 10 essentially in that it includes a sealing device 401 that includes a portion 402 that is intended to come into contact with the surface of the tubular component and that is elastically flexible. More specifically, the portion 402 is elastically flexible in at least one longitudinal axial direction of the protector. The linking portion of narrow section linking the portion 402 to the sealing device 401 makes it possible to maintain a seal even if there is a significant dimensional variation in the surface of the component or of the protector on account of manufacturing variations or thermal variations.

The flexibility of the portion 402 enables the seal to be adapted to the surface irregularities of the tubular component to be protected.

Furthermore, like the protector 10, the sealing device 401 of the protector 100 is fitted with a flap 404 designed to limit the exposure of the portion 402 to ultraviolet light.

FIG. 4 shows the gasket surrounding the thread of the component before the threads are meshed.

A protector 200, as shown in FIGS. 7a and 7b, include a sleeve 202 and a sealing device 204 that cooperate with one another and are designed to be placed on the (threaded) female extremity of a component. The sealing device 204 includes a body 241 and a lip 242. The features shared with the preceding embodiments, in particular the materials used, are not described again. The female extremity includes an internal thread 50 prolonged by a substantially radial end surface 51. A seal seat 52 is machined on the side of the internal thread 50 opposite the end surface 51. A stop surface 53 oriented mainly radially is formed between the seal seat 52 and the bore of the body of the component.

The sleeve 202 is designed to protect at least one portion of the internal thread of the female extremity and, potentially, at least one seal seat that is also part of the female extremity. To do so, the sleeve 202 is designed to be attached to the female extremity and is formed on the female extremity. In the half cross-sectional axial view, the sleeve 202 has an overall T-shaped section.

The sleeve 202 includes an upstream end portion 221 designed to be positioned away from the female extremity. The upstream end portion 221 is thick and designed to absorb shocks and impacts. The upstream end portion 221 is designed to cover the transverse annular surface at the extremity of the free end portion of the female extremity, which is usually a stop surface. The upstream end portion 221 can provide a continuous local annular seal with the free end portion of the female extremity. The upstream end portion 221 is overall ring-shaped. The upstream end portion 221 has an outer surface 221a and a bore 221b.

A notch 227 is formed in the outer surface 221a. The notch 227 is oriented radially inwards. The depth of the notch 227 is less than the radial thickness of the upstream end portion 221. The notch 227 is positioned in the vicinity of the free end portion of the female extremity in the tightened state (see FIG. 7b). The notch 227 delimits a portion 226 that is elastically deformable in the axial direction of the upstream end portion 221. The elastically deformable portion 226 is arranged to face the free end surface 51 of the female extremity during tightening (see FIG. 7a) and in contact with the end surface 51 of the female extremity in the tightened state (see FIG. 7b). When tightening is complete, the notch 227 is at least partially closed, providing a visual indication that tightening is complete.

The sleeve 202 includes a downstream end portion 225. The upstream end portion 221 and the downstream end portion 225 form the top bar of the T. The downstream end portion 225 bears the sealing body 241. The downstream end portion 225 has a small-diameter bore next to the upstream end portion 221 and a large-diameter bore located away from the upstream end portion 221. The downstream end portion 225 has a large-diameter outer surface next to the upstream end portion 221 and a small-diameter outer surface located away from the upstream end portion 221.

In this case, the sealing body 241 is overmoulded on the large-diameter bore. The sealing body 241 is overmoulded on an end radial surface of the downstream end portion 225. The sealing body 241 is also overmoulded on the small-diameter outer surface. Thus, the sealing body 241 is firmly attached to the downstream end portion 225 by at least two coaxial surfaces. The lip 242 projects radially outwards and axially against the upstream end portion 221. The lip 242 is designed to come into sealing contact with a bore of the female extremity of the component in the position shown in FIG. 7b, the downstream end portion 225 projecting inside said female extremity.

The sleeve 202 includes a frustoconical outer surface 202a between the downstream end portion 225 and the upstream end portion 221. The diameter of the frustoconical outer surface 202a increases between the downstream end portion 225 and the upstream end portion 221. The frustoconical outer surface 202a is designed to pass freely into the female thread of the female extremity of the component. The external diameter of the frustoconical outer surface 202a is less than the internal diameter of the female thread. The sleeve 202 includes an external thread 224 between the frustoconical outer surface 202a and the elastically deformable portion 226. The external thread 224 is designed to engage with the female thread of the female extremity of the component in the state shown in FIG. 7b. As shown in FIG. 7a, the external thread 224 comes into contact with said female thread substantially at the same time as the lip 242 comes into contact with the bore of the female extremity. In this case, the lip 242 comes into contact with the bore of a main portion of the female extremity, i.e. a bore located downstream of the machined areas.

The sleeve 202 includes an inward-oriented radial projection in the form of a flange or disk 22 forming a shutter. In one embodiment, the flange 22 extends along a radial partition 23 closing the sleeve on the side opposite the sealing device 4. The radial partition 23 forms a stopper. The radial partition 23 is positioned axially in the area of the frustoconical outer surface 202a. The flange 22 enables the bore of the upstream end portion 221 to be radially offset from the small-diameter bore of the downstream end portion 225. The diameter of the small-diameter bore of the downstream end portion 225 is less than the diameter of the bore of the upstream end portion 221. The radial partition 23 may include a small-diameter through-hole to enable pressure balancing, notably in the presence of barometric and altimetric variations.

The thread 224 extends axially over a distance equal to or less than the axial length of the thread of the extremity of the component.

When installing the protector 1, when the thread 224 begins to engage with the thread of the extremity of the component, the sealing device 4 is located downstream beyond said thread of the female extremity of the component.

The invention is not limited to the examples described above, which are provided purely by way of example, but encompasses all of the variants that could be envisaged by the person skilled in the art within the scope of the claims below.

The invention claimed is:

1. A tubular threaded joint component for drilling or operating hydrocarbon wells, comprising:
   an extremity fitted with at least one internal thread and including a free end portion;
   a smooth body downstream of the threaded extremity; and
   a temporary protector screwed onto said internal thread of said extremity, said protector comprising:
      a sleeve configured to be attached to the extremity of the component and to protect said free end portion and the internal thread of said extremity of the component, said sleeve having a frustoconical outer surface and an external thread that is configured to engage with the internal thread of the extremity of the component and that extends axially over a distance equal to or less than the axial distance of the internal thread of the extremity of the component the frustoconical outer surface having an external diameter that is less than an internal diameter of the internal thread such that the frustoconical outer surface is not in direct contact with the extremity of the component,
      a peripheral sealing device assembled sealingly on a downstream end of the sleeve and configured to be brought into contact with the smooth body of said component located downstream of the internal thread of the extremity of the component, such as to provide a seal downstream of said internal thread, the frustoconical outer surface of the sleeve being located between the external thread and the peripheral sealing device, and the peripheral sealing device includes a lip that extends radially outward further than the downstream end of the sleeve, and
      a secondary sealing device that can be brought into contact firstly with a surface of said component, at least at the free end portion of the extremity of the component, and secondly with said sleeve such as to provide a seal upstream of said internal thread,
   wherein the component is dimensioned such that, when the protector is being installed on the tubular component, at the time that the external thread of the sleeve first engages with the internal thread of the extremity of the tubular joint component, the portion of the peripheral sealing device is in direct contact with the smooth body of said component located axially downstream of the internal thread of the extremity of said component.

2. The component according to claim 1, wherein the ratio of the axial distance of the internal thread of the extremity of the tubular component to the axial distance of the external thread of the sleeve of the protector is equal to or greater than 2.

3. The component according to claim 1, wherein the peripheral sealing device is rigidly connected to the sleeve.

4. The component according to claim 3, wherein the peripheral sealing device is secured to the sleeve by overmoulding.

5. The component according to claim 4, wherein the peripheral sealing device is secured to the sleeve by overmoulding performed by two-component injection.

6. The component according to claim 1, wherein the contact surface between the peripheral sealing device and the sleeve is greater than 10% of the total length of the sleeve.

7. The component according to claim 1, wherein the peripheral sealing device has at least one flap extending at least above the portion of the peripheral sealing device designed to come into contact with the surface of the component in order to at least partially protect same from the light.

8. The component according to claim 1, wherein the portion of the peripheral sealing device designed to come into contact with the surface of the tubular component is elastically flexible in at least one longitudinal axial direction of the protector.

9. The component according to claim 1, wherein the portion of the peripheral sealing device designed to come into contact with the surface of the tubular component has a bevelled contact surface and a longitudinal section that increases in the downstream-to-upstream direction.

10. The component according to claim 1, wherein the ratio of the axial distance of the internal thread of the extremity of the tubular component to the axial distance of the external thread of the sleeve of the protector is equal to or greater than 3.

11. The component according to claim 1, wherein the contact surface between the peripheral sealing device and the sleeve is greater than 20% of the total length of the sleeve.

12. A tubular threaded joint component for drilling or operating hydrocarbon wells, comprising:
   an extremity fitted with at least one external thread and including a free end portion;
   a smooth body downstream of the external threaded extremity; and
   a temporary protector screwed onto said external thread of said extremity, said protector comprising:

a sleeve configured to be attached to the extremity of the component and to protect said free end portion and the external thread of said extremity of the component, said sleeve having an internal thread that is configured to engage with the external thread of the extremity of the component and that extends axially over a distance equal to or less than the axial distance of the external thread of the extremity of the component, a peripheral sealing device assembled sealingly on a downstream end of the sleeve and configured to be brought into contact with the smooth body of said component located downstream of the external thread of the extremity of the component, such as to provide a seal downstream of said external thread, and a secondary sealing device that can be brought into contact firstly with a surface of said component, at least at the free end portion of the extremity of the component, and secondly with said sleeve such as to provide a seal upstream of said external thread, wherein the component is dimensioned such that, when the protector is being installed on the tubular component, at the time that the internal thread of the sleeve first engages with the external thread of the extremity of the tubular joint component, the portion of the peripheral sealing device is in direct contact with the smooth body of said component located axially downstream of the external thread of the extremity of said component, and wherein the secondary sealing device includes a flange positioned at an upstream end of the sleeve, the flange extending radially inward from the sleeve, the secondary sealing device includes a partition that extends within the sleeve to close an end of the sleeve, the partition includes a radial portion at a center of the sleeve and a circular portion extending axially within the sleeve, the circular portion is connected to the radial portion at a first end and connected to the flange at a second end such that the radial portion is closer to the downstream end of the sleeve than the flange, and the radial portion of the partition is positioned within a bore of the extremity when the internal thread of the sleeve is fully engaged with the external thread of the extremity of the tubular joint component.

\* \* \* \* \*

UNITED STATES PATENT AND TRADEMARK OFFICE
CERTIFICATE OF CORRECTION

PATENT NO. : 10,788,156 B2
APPLICATION NO. : 15/537727
DATED : September 29, 2020
INVENTOR(S) : Aguilar Mendez et al.

Page 1 of 1

It is certified that error appears in the above-identified patent and that said Letters Patent is hereby corrected as shown below:

In the Specification

In Column 3, Line 5, delete "thread," and insert -- thread. --, therefor.

In Column 7, Line 41, delete "57916." and insert -- S7916. --, therefor.

In the Claims

In Column 11, Claim 1, Line 54, delete "component" and insert -- component, --, therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*